Aug. 22, 1939.　　　　B. S. AIKMAN　　　　2,170,228
LUBRICATING DEVICE
Filed April 8, 1937　　　　3 Sheets-Sheet 1

Fig.1.

INVENTOR
BURTON S. AIKMAN
BY *Wm. M. Cady*
ATTORNEY

Patented Aug. 22, 1939

2,170,228

UNITED STATES PATENT OFFICE 2,170,228

LUBRICATING DEVICE

Burton S. Aikman, Wilkinsburg, Pa., assignor to The Westinghouse Air Brake Company, Wilmerding, Pa., a corporation of Pennsylvania Application April 8, 1937, Serial No. 135,619

18 Claims. (Cl. 184—29)

This invention relates to lubricators, and more particularly to a lubricator of the force-feed type for a fluid compressor or the like.

It has been proposed to provide automatic lubrication for fluid pressure engines such as the steam driven air compressor employed on a locomotive for supplying fluid under pressure to the air brake system, the lubricator for this purpose being designed to supply oil in proper quantities and at sufficient pressure to the several operating elements of the compressor for insuring constant lubrication thereof as long as the compressor is operated.

One object of my invention is to provide an improved lubricator of the above type which is adapted to supply a proper quantity of oil for lubricating a compressor or the like at predetermined intervals during operation thereof.

Another object of the invention is to provide a lubricator of simple and sturdy construction and which may be operated for a long period of service without requiring attention or repairs.

A further object is to provide an improved lubricating device comprising multiple force-feed means operative to supply oil through separate lubricant ducts to operating parts of a compressor, and means effective at all times for preventing undesired back flow of fluid under presure from the ducts to the lubricating device.

A still further object of my invention is to provide a fluid compressor lubricating device having means operative to effect a periodic build-up of pressure on the oil therein at intervals timed with relation to the rate of operation of the compressor, and means responsive to a predetermined increase in the pressure of oil in the device to supply a quantity of oil of the desired grade therefrom for lubricating the compressor.

Other objects and advantages will be apparent from the following more detailed description of the invention, taken with reference to the accompanying drawings, wherein:

Figure 1:
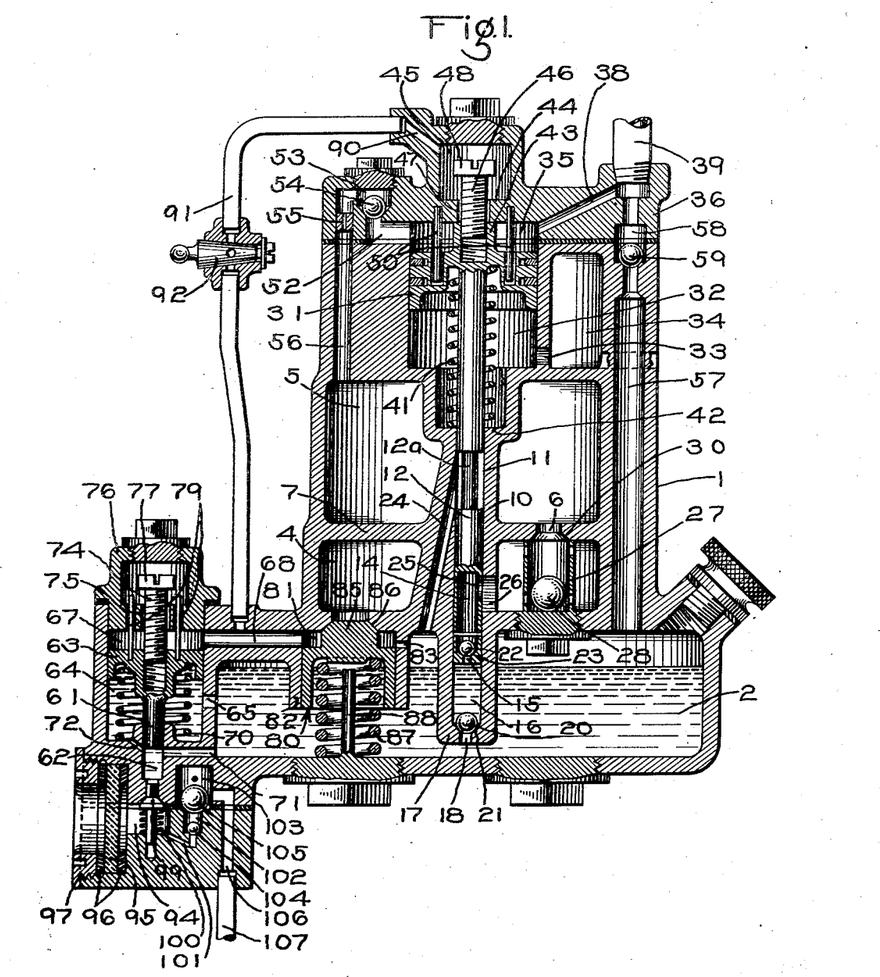
Fig. 1 is a vertical sectional view of a lubricating device constructed in accordance with one form of my invention.

Referring to Fig. 1 of the drawings, the lubricating device in the form there shown comprises a main casing 1 having a lower portion in which is formed a supply chamber 2 adapted to contain a quantity of fluid lubricant, and a substantially cylindrical upper portion in which are formed a control or metering chamber 4 and a pressure chamber 5 communicating therewith through an aperture 6, which is provided in a wall 7 separating the chambers 4 and 5. The chambers 4 and 5 surround a centrally disposed columnar portion 10 of the main casing 1 having formed therein a bore 11, in which is slidably mounted a pump plunger 12.

The lower end of the plunger 12 constitutes a means for pumping oil from the supply chamber 2 to the metering chamber 4, and is provided with a chamber 14 and a port 15, through which the chamber 14 communicates with a chamber 16 which is formed at the bottom face of the plunger 12 within a downwardly extending portion 17 of the casing. The chamber 16 communicates through a passage 18 with the supply chamber 2, and has disposed therein a ball check valve 20 which is adapted to engage a seat 21 surrounding the passage 18 for preventing back flow of oil from the chamber 16 to the chamber 2. Similarly, back flow of oil from the chamber 14 in the plunger 12 to the chamber 16 is prevented by a ball check valve 22 which is carried in the plunger 12 and is adapted to engage a seat 23 adjacent the port 15, the chamber 14 being at all times open to the metering chamber 4 by way of an aperture 25 formed in the plunger 12 which is adapted to register with an opening 26 formed in the portion 10 of the main casing 1. In order to avoid escape of oil by seepage past the plunger 12 into chamber 32, the plunger is provided with an intermediate reduced portion 12a which is adapted to register with a passage 24 communicating with the supply chamber 2.

A perforated cage element 27 is mounted within metering chamber 4, and contains a float valve 28, which may be made of cork or light composition material and which is adapted to be floated into seating engagement with an annular seat 30 formed around the aperture 6 in the wall 7 for preventing access of oil from the chamber 4 to chamber 5.

The plunger 12 is adapted to be reciprocated by a piston 31 which is slidably mounted in a suitable bore formed in the upper portion of the main casing 1, the piston forming at the lower side a chamber 32 connected through a passage to an atmospheric cavity 34, and at the upper side a chamber 35 which is formed within a casing section 36 that is secured to the main casing 1 by suitable means, not shown. The chamber 35 is connected by way of a passage 38 formed in the casing section 36 to a pipe 39 which communicates with a suitable source of fluid pressure supply, such as a compression chamber of a compressor.

A spring 41 is interposed between the piston 31 and a shoulder 42 at the lower end of chamber 32 for urging the piston upwardly, and the piston is provided with means limiting its upward movement comprising a central boss portion 43 adapted for engagement with a wall 44 formed in the casing section 36. The boss portion 43 has a suitably threaded bore for receiving a bolt 46, which extends through an aperture 47 in the wall 44 into a chamber 45 formed in the casing section 36 and carries a head 48 adapted to engage the upper surface of the wall for limiting the downward movement of the piston. A pair of guide pins 50 are secured in the casing section 36 and extend downwardly through the chamber 35 into suitable recesses formed in the piston 31 for preventing undesired rotation thereof.

The chamber 35 communicates by way of a passage 52 with a valve chamber 53, in which is disposed a ball check valve 54 adapted to prevent back flow of fluid therefrom to the passage 52, the valve chamber 53 being connected through a restricted passage 55 and a passage 56 with the pressure chamber 5 in the main casing 1. The main casing 1 also has a passage 57 communicating at the lower end with the supply chamber 2 above the level of the lubricant therein, and at the other end with a valve chamber 58, which is connected to the pipe 39 and contains a ball check valve 59 adapted to prevent back flow of fluid from the valve chamber to the passage 57.

For supplying oil under pressure from the supply chamber 2 to the compressor or other mechanism to be lubricated there is provided oil forcing means comprising a pump element or plunger 61 operatively mounted in a bore 62 formed in the casing and a piston 63 adapted to operate the plunger, said piston having at one side a chamber 64 always open through a passage 65 to the supply chamber 2, and at the other side an operating chamber 67 which is adapted to communicate by way of a passage 68 with the metering chamber 4 as hereinafter explained. A spring 70 is disposed in the chamber 64 between the lower wall thereof and the piston 63 and is adapted to urge the piston upwardly into the position shown in the drawing, so that the upper end of the bore 62 is normally open through a supply passage 71 to the chamber 2 and also through a passage 72 to the chamber 64, these passages being adapted to be closed by the plunger when it is moved downwardly as hereinafter described.

The piston 63 is provided with an adjustable stop bolt 74 which has screw-threaded engagement therewith and extends through an opening 75 formed in a hollow cap 76 that is secured to the casing, the head 77 of the stop bolt being adapted to engage the portion of the cap 76 surrounding the opening 75 for limiting the downward stroke of the piston. Two guide pins 79 are secured to the piston 63 and extend through suitable bores formed in the cap 76 to prevent the piston from turning.

The piston 63 is adapted to be actuated either by oil under pressure or by air under pressure according to the manner of operation of the lubricator as hereinafter described. The supply of oil under pressure for operating the piston 63 is controlled by a valve piston which is indicated generally at 80 and is slidably mounted in a bore 81 formed in a sleeve portion 82 provided on the main casing 1 within the supply chamber 2, the bore 81 being open to the passage 68 and connected though a restricted passage 83 to the supply chamber 2. The valve piston 80 has a central boss portion 85 of smaller diameter than that of the bore 81, which boss portion is adapted to engage an annular valve seat 86 formed on the casing, for controlling communication between the chamber 4 and the bore 81. A spring 87 is interposed between the valve piston 80 and a wall of the chamber 2 for urging the valve piston into its seated position, and a stop member 88 is provided for engagement with the valve piston to limit movement thereof away from seat 86. It will be noted that with the valve piston in the seated position as shown in Fig. 1, only the area of the boss portion 85 within the annular seat 86 is exposed to the chamber 4.

In order to permit a direct supply of air or other fluid under pressure from the compressor for operating the piston 63, at a fast rate when desired, there is provided a by-pass communication comprising a passage 90 connected to the chamber 45 in the casing section 36, and a pipe 91 communicating with said passage and with the passage 68, a manually operable cut-off valve 92 being interposed in the pipe 91 for controlling communication therethrough.

Means is provided for permitting the flow of oil supplied by the lubricator to be observed comprising a viewing glass 95 constituting a wall of a valve chamber 94, which viewing glass is secured to the casing between annular gaskets 96 by means of a screw-threaded clamping ring 97. The valve chamber 94 contains a check valve 99 which is urged into seated position by the pressure of a spring 100 for preventing back flow of fluid from the chamber 94 to the chamber 62. The valve chamber 94 communicates through a passage 101 with a pair of connected valve chambers 102 and 103, which contain lower and upper ball check valves 104 and 105, respectively, and the valve chamber 103 communicates through a passage 106 with a pipe 107 leading to the compressor or other mechanism to be lubricated, it being apparent that the possibility of back flow or leakage of fluid therefrom to the lubricator is obviated by the arrangement of the three check valves.

In operation it will be understood that air under pressure is alternately supplied to and vented from the piston chamber 35 by way of the pipe 39 and passage 38, in timed relation to the speed of operation of the compressor. When air under pressure is supplied to the chamber 35, the piston 31 is forced downwardly against the pressure of the spring 41, thereby moving the plunger 12 in the same direction so that the lower end thereof displaces oil initially contained in the chamber 16, the oil being forced through the opening 15 and past the ball check valve 22 into the chamber 14 within said plunger, the ball check valve 20 preventing back flow of the oil into chamber 2. The quantity of oil forced from the chamber 16 past the valve 22 into the chamber 14 is, of course, limited in accordance with the length of stroke of the plunger 12 as determined by adjusted position of the stop bolt 46 which is adapted to engage the wall 44 of the casing section 36.

At the same time, air under pressure is supplied from the chamber 35 through the passage 52, past the ball check valve 54, through the restricted passage 55 and the passage 56 to the pressure chamber 5 as well as to the metering chamber 4 connected thereto, it being understood that the pressure of air thus supplied to the chamber 4 is insufficient to unseat the valve piston 80 against the pressure of the spring 87.

When the pressure of air in the chamber 35 is then reduced on the suction stroke of the compressor, the spring 41 is permitted to move the piston 31 upwardly until the boss 43 thereon engages the wall 44 of the casing section 36. The plunger 12 is thereby pulled upwardly, thus creating a partial vacuum in chamber 16, so that oil is drawn from the supply chamber 2 through the passage 18 and past the ball check valve 20 into the chamber 16, substantially filling the chamber. Meanwhile, the oil already forced into the chamber 14 within the plunger 12 is free to flow through the aperture 25 and through the opening 26 registering therewith into the metering chamber 4.

When the pressure of air in the piston chamber 35 is again increased as a result of a compression stroke of the compressor, the piston 31 is operated to move the plunger 12 downwardly so as to displace oil from the chamber 16 as already described, the oil flowing past the ball check valve 22 into the chamber 14 and thence through the aperture 25 and opening 26 into the metering chamber 4. The subsequent upward movement of the plunger 12 then causes more oil to be drawn from the chamber 2 into the chamber 16. As the above described cycle of operation is repeated, the level of the oil thus supplied to the metering chamber 4 gradually rises, while the pressure of air supplied to the chamber 5 is built up to a value approaching the maximum pressure of air supplied to the piston chamber 35. The floating check valve 28 is thereby carried upwardly within the apertured cage 27 until, when the chamber 4 is substantially filled, said check valve is moved into engagement with the annular seat 30, preventing further communication between the chamber 4 and chamber 5.

With the metering chamber 4 substantially full of oil and the floating valve 28 in engagement with the seat 30, the subsequent cyclic increase in the pressure of air in the chamber 35 again causes the piston 31 to move the plunger 12 downwardly so as to displace oil from the chamber 16 into the chamber 14, this time creating a hydraulic pressure in the metering chamber 4 of sufficient value to overcome the spring 87 and force the valve piston 80 away from the seat 86.

When the valve piston 80 is thus moved away from the seat 86, oil under pressure flows from the chamber 4 into the bore 81 and acts on the full pressure area of the valve piston so as to maintain it unseated against the pressure of the spring 87, while oil under pressure is supplied from the bore 81 through the passage 68 to the piston chamber 67. The volume of air under pressure in the chamber 5 is meanwhile permitted to expand, the air flowing through the aperture 6 and past the check valve 28 into the metering chamber 4, where the air under pressure acts against the oil therein, thereby maintaining the fluid pressure in the connected chambers 81 and 67.

The fluid pressure thus built up in the operating chamber 67 quickly moves the piston 63 and the plunger 61 downwardly, overcoming the force of the spring 70, the plunger 61 thereby cutting off communication from the passages 72 and 71 to the bore 62 and forcing oil from the bore past the check valve 99 and into the valve chamber 94. Assuming that several cycles of operation of the plunger 61 as above described have already taken place, so that the connected chambers 94, 102 and 103 as well as the passage and pipe 106 are filled with oil, it will be evident that the downward stroke of the plunger 61 will effect the supply of the same quantity of oil under pressure to the compressor as is displaced from the chamber 62.

During the operation of the piston 63 and plunger 61 just described, the oil under pressure in the bore 81 is gradually discharged by way of the restricted passage 83 to the supply chamber 2, so that after the downward stroke of the plunger 61 has been completed, the air under pressure which was bottled up above the oil in the chambers 5 and 4 is vented by way of the bore 81, passage 83, the chamber 2, the passage 57, past the ball check valve 59, and through the chamber 58 and the pipe 39. It will be noted that by thus venting the air under pressure from the chamber 2 into the pipe 39, the oily vapors contained in the air which would otherwise be wasted, are retained in the fluid pressure system, being either drawn into the compression chamber on the suction stroke of the compressor, or supplied to the piston chamber 35 in the lubricating device upon an alternate compression stroke.

If it is desired to operate the lubricating device to deliver oil at a fast rate, as when the compressor to be lubricated is initially put into operation, the plug valve 92 may be turned to the open position, thereby establishing the by-pass communication from the pipe 39 and chamber 35 through the opening 47, the chamber 45, the passage 90, the pipe 91 and passage 68 to the operating chamber 67. Air under pressure is then alternately supplied to and vented from the chamber 67 by way of this direct communication in accordance with the compression and suction strokes of the compressor, and as a result the piston 63 and plunger 61 are rapidly reciprocated, the plunger alternately drawing oil from the chamber 2 into the bore 62 and forcing oil therefrom past the check valves 99, 104 and 105 through passage 106 to the pipe 107. When sufficient oil has been supplied to the compressor by the above operation of the lubricating device at a fast rate, the plug valve 92 is again closed, and normal operation of the lubricating device as hereinbefore described is resumed.

Figures 2, 3, 4:
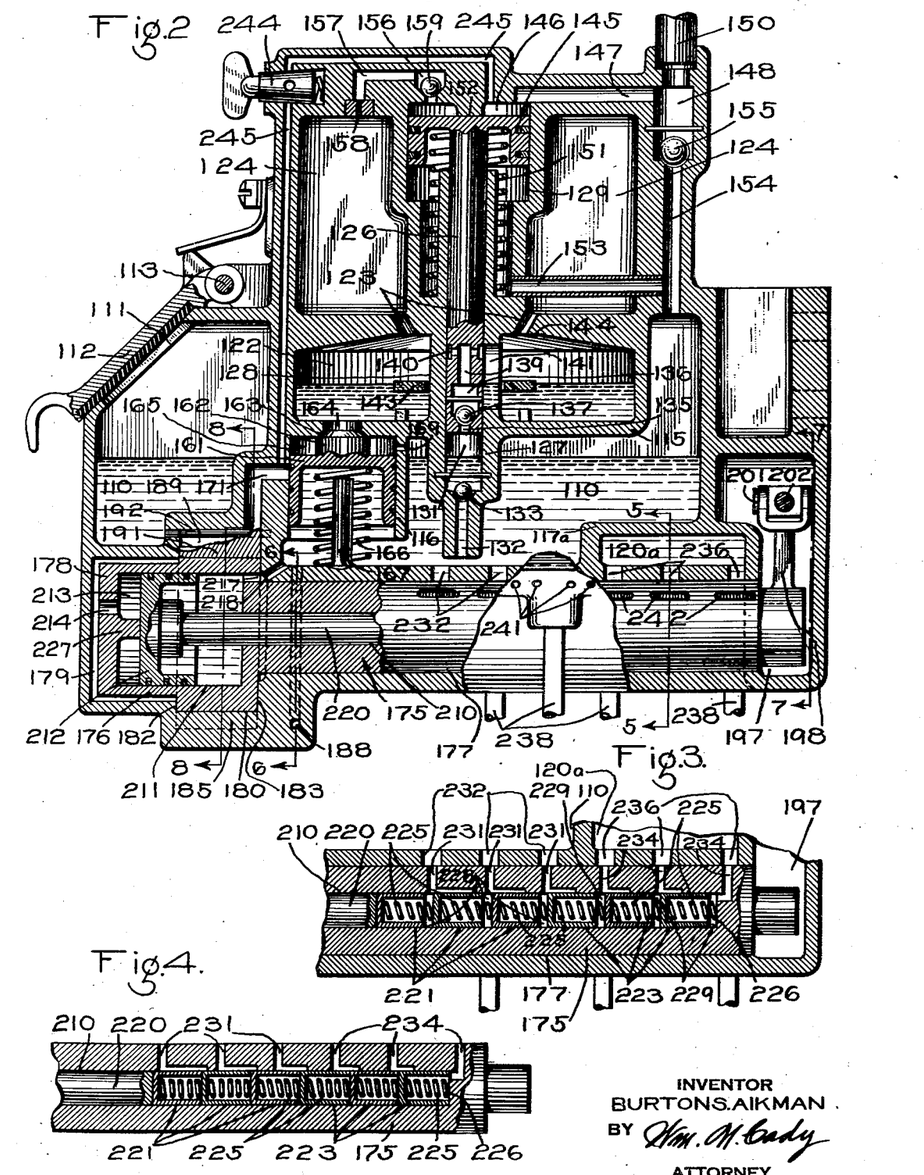
Fig. 2 is a vertical sectional view of a lubricating device embodying my invention in another form thereof, the device being shown diagrammatically.
Figs. 3 and 4 are sectional views of the oil distributing means comprising part of the device shown in Fig. 2, illustrating different positions thereof.

Referring to Fig. 2 of the drawings, there is illustrated another form of the invention, embodied in a lubricating device the principle of operation of which is similar to that of the device shown in Fig. 1, but which includes additional features of construction, and novel means for distributing oil under pressure from separate supply reservoirs through a plurality of conduits leading to different operating parts of the compressor or other mechanism to be lubricated. As shown diagrammatically in Fig. 2 the lubricating device comprises a casing having an operating oil supply chamber 110 adapted to be supplied with oil of a certain grade by way of a filling opening 111 formed in the casing, the opening being normally closed by a cover 112 that is hinged on a pin 113 carried by the casing.

Figures 5, 6, 7, 8, 9, 10, 11:
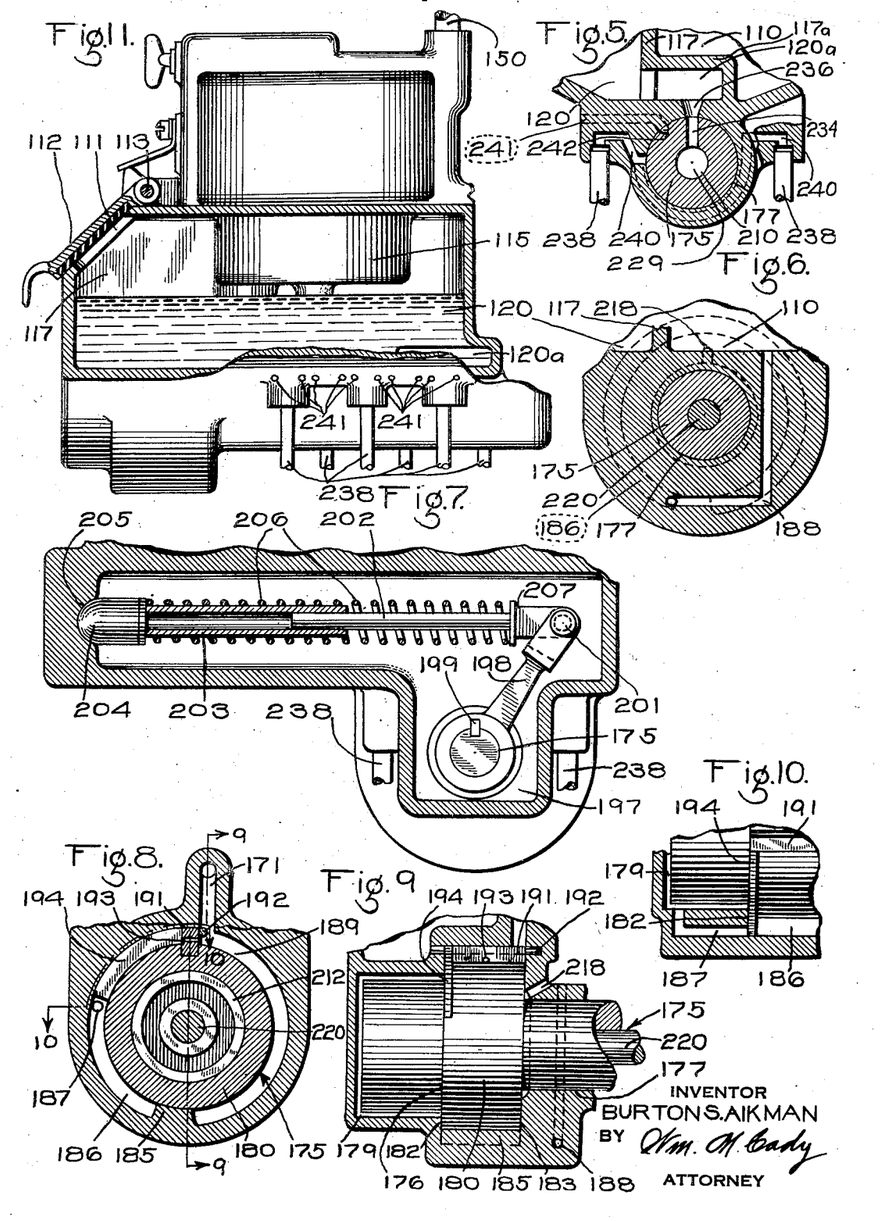
Figs. 5, 6, 7 and 8 are sectional views taken on lines 5—5, 6—6, 7—7 and 8—8, respectively, of Fig. 2.
Fig. 9 is a view partly in section, taken substantially on the line 9—9 of Fig. 8.
Fig. 10 is a view taken substantially on the line 10—10 of Fig. 8.
Fig. 11 is another vertical view, reduced in scale, of the lubricating device shown in Fig. 2, the device being shown sectioned in a plane different from the plane of section in Fig. 2.

Formed within the chamber 110 is a pump housing portion of the casing, indicated generally at 115, and a cylinder portion 116, and as is best shown in Fig. 11 an interior wall 117 is joined to said portion and separates the chamber 110 from an auxiliary oil supply chamber 120, a lower extension 120a of which is defined by an offset portion 117a of the wall as shown in Figs. 2 and 5 of the drawings. The chamber 120 may contain oil of a different grade than that in the chamber 110, the wall 117 extending into the filling opening 111 so that both chambers may be supplied with the proper oil when desired.

The portion 115 of the casing has formed therein a control or metering chamber 122 which communicates through passages 123 with a pressure chamber 124 formed in the uppermost portion of the casing. An oil pump is provided for pumping oil from the supply chamber 110 into the metering chamber 122, which pump comprises a plunger 126 slidably mounted in a central bore provided in a projection 127 depending from the portion 115 into the chamber 110 and in a columnar portion 128 formed within the chamber 122, said bore at its upper end being in communication with a cylinder 129.

A chamber 131 is located at the lower face of the plunger 126 within the projection 127 and communicates with a downwardly extending passage 132 which opens into the supply chamber 110 below the level of the oil therein, a ball check valve 133 being disposed in the chamber 131 for preventing back flow of oil therefrom to the passage 132. The chamber 131 communicates through a port 135 formed in the plunger 126 with a valve chamber 136, which is also formed in the plunger and contains a ball check valve 137 adapted to prevent back flow of fluid from the valve chamber through the passage 135 to the chamber 131. The valve chamber is at all times open to the metering chamber 122 by way of an interior bore 139 formed in the plunger, an annular groove 140 also formed in the plunger and an aperture 141 formed in the portion 128 of the casing.

An annular float valve element 143 is loosely fitted around the portion 128 of the casing within the metering chamber 122 and is adapted to engage a seating face 144 surrounding the passages 123 in the upper wall of the chamebr 122 for cutting off communication between said chamber and the pressure chamber 124 after the chamber 122 is filled with oil in the manner hereinafter described.

For operating the plunger 126 there is provided a piston 145 which is slidably mounted in the cylinder 129 and forms at the upper face thereof a chamber 146, which is connected through a passage 147 and a valve chamber 148 with a pipe 150 which may be connected to the compression chamber of the fluid compressor, not shown. A spring 151 is disposed in the cylinder 129 and acts against the piston 145 for urging the piston and consequently the plunger 126 upwardly to a position in which the piston engages a stop lug 152. A conduit 153 is provided for connecting the lower end of the cylinder 129 with a passage 154 which leads in one direction to the chamber 110 and in the other direction to the valve chamber 148, the valve chamber containing a ball check valve 155 for preventing back flow of fluid under pressure from the valve chamber to the passage 154. The chamber 146 above the piston 145 communicates through a valve chamber 156, a passage 157 and a restricted port 158 with the pressure chamber 124, back flow of fluid under pressure from the valve chamber to the chamber 146 being prevented by a ball check valve 159 disposed in the valve chamber.

Slidably mounted in the cylinder portion 116 which opens into the oil supply chamber 110 is a valve piston 161, which has a boss portion 162 centrally disposed thereon and adapted to engage an annular valve seat 163 that is formed on an interior wall of the casing and surrounds an opening 164 through which the metering chamber 122 may communicate with a chamber 165 provided at the upper side of the valve piston 161. A spring 166 is interposed between the valve piston 161 and the lower wall of the chamber 110 for normally maintaining the valve piston in the seated position as shown in Fig. 2 of the drawings, and a stop element 167 is provided for engaging the valve piston to limit downward movement thereon.

The chamber 165 communicates through a restricted pasasge 169 formed in the cylinder portion 116 with the oil supply chamber 110, and is adapted to communicate with a passageway 171 formed in the casing when the valve piston 161 is moved downwardly in the manner hereinafter described, the passageway 171 being normally covered by the valve piston when it is in the seated position as shown in the drawings.

As a means for forcing oil of the proper grade and in the desired quantity to the different working parts of the compressor, there is provided a force-feed distributing mechanism which is mounted in the lower portion of the lubricating device, and which is adapted to operate in response to the pressure of oil periodically supplied by the pump and associated elements already described for delivering predetermined quantities of oil from each of the supply chambers 110 and 120 through a plurality of separate delivery conduits. The distributing mechanism comprises a horizontally disposed sleeve member, indicated generally at 175 which has formed on one end thereof an enlarged cylinder portion 176, and is rotatably mounted in a suitable bore 177 formed in the casing beneath the oil supply chambers 110 and 120.

The cylinder portion 176 carried on the sleeve member 175 is adapted to revolve with that member and has a bearing portion 180 of relatively large diameter, which is formed adjacent an end 178, of reduced diameter extending into a chamber 179. The bearing portion 180 is closely fitted between annular off-set shoulders 182 and 183 which define an enlarged bore formed within the casing in coaxial alignment with the bore 177 and surrounding said bearing portion 180. As is best shown in Fig. 8 of the drawings, the bearing portion 180 is adapted to to rest in sliding engagement on a transversely disposed wall 185 which projects into the bore surrounding the bearing portion, there being thus formed on one side of the wall 185 a curved chamber 186 which communicates through a passage 187 formed in the shoulder 182 with the chamber 179, and through a passage 188 with chamber 110. On the other side of the wall 185 is provided a curved chamber 189 which is open to the passageway 171.

As is best shown in Figs. 8 and 9 of the drawings, a transversely disposed vane 191 is mounted on the bearing portion 180 of the sleeve element and has a sliding fit with the wall of the bore and with the shoulders 182 and 183, a portion of said vane being secured in any suitable manner within a suitable groove formed in the bearing portion. The vane 191 is adapted in a normal position thereof to engage a stop pin 192 which is fitted into the casing and extends across the chamber 189, and is provided with a restricted relief passage 193 connecting chambers 186 and 189. As hereinafter more fully explained, the vane 191 is adapted to be subjected to the pressure of oil or other fluid supplied to the chamber 189 for turning the sleeve element 175 in a counterclockwise direction, as viewed in Fig. 8.

For controlling communication through the passage 187, an arcuate valve element 194 is provided within the chamber 186, which valve element is fitted on the bearing portion 180 and secured to the vane 191 in a suitable manner, the valve element being thereby maintained in sliding engagement with the shoulder 182. The length of the arcuate valve element 194 is such that the valve element is adapted to cover the passage 187 upon initial rotary movement of the sleeve member 175 in a counterclockwise direction as viewed in Fig. 8, said valve element permitting continued rotation of the member 175 until the vane 191 is moved past the passage 187 to establish communication between said passage and the chamber 189. The free end of the valve element 194 is adapted to engage the wall 185 for limiting the rotary movement of the sleeve member.

The end of the sleeve member 175 opposite the end 178 extends into a chamber 197 formed in the right-hand portion of the casing as viewed in Fig. 2, and has mounted thereon an arm 198 which is secured to the shaft member by means of a key 199. As shown in Fig. 7 the upper end of the arm 198 is pivotally connected by means of a pin 201 to a rod 202, which is disposed transversely within the chamber 197 and is slidably mounted in a sleeve element 203 having a rounded end portion 204 operatively fitted into a suitable depression 205 formed in the casing. A coil spring 206 is interposed between the end 204 of the sleeve element 203 and a collar 207 provided on the rod 202, and acts through the medium of the arm 198 to urge the sleeve member 175 in a clockwise direction, thereby so positioning said member that the vane 191 on the bearing portion 180 is normally maintained in engagement with the stop pin 192, as shown in Fig. 8 of the drawings.

Formed in the sleeve member 175 is an axial bore 210 which opens into an enlarged bore 211 provided in the cylinder portion 176 within which is mounted a piston 212 having on one side a piston chamber 213 communicating through an aperture 314 in the end 178 of the cylinder portion with the chamber 179. The portion of the bore 211 on the other side of the piston 212 is connected by way of an aperture 217 formed in the cylinder wall and a passage 218 formed in the casing with the supply chamber 110. The piston 212 is adapted to operate a plunger 220, one end of which is secured to the piston and the other end of which is slidably mounted in the bore 210 formed in the sleeve member 175.

As is best shown in Figs. 3 and 4 in the drawings, the plunger 220 is adapted to extend through only a portion of the length of the bore 210, which has mounted therein beyond the plunger a plurality of cylindrical pump elements, designated in groups at 221 and 223, the pump elements being arranged in operative alignment with the end of the plunger 220. A plurality of coil springs 225 are provided for urging the pump elements 221 and 223 apart as shown in Fig. 3, one of said springs being interposed between each pair of adjacent ends of the pump members, it being noted that the spring 225 acting on the pump element 223 in the extreme right-hand end of the bore engages an end wall 226, so that the cumulative force of all of springs is effective to act through the respective pump elements and the plunger 220 for urging the piston 212 toward the left-hand and into engagement with a stop lug 227 projecting from the end wall 178.

It will thus be apparent that with the respective springs 225 expanded and the pump elements 221 and 223 thereby spaced apart as shown in Fig. 3 of the drawings, the valve elements are adapted to provide a series of chambers defined within the bore 210, as designated at 228 and 229. In order to permit the chambers 228 to be filled with oil from the supply chamber 110, the sleeve member 175 is provided with suitably formed passages 231 extending radially from the bore 210 and so positioned as to open only into the chambers 228, said passages being adapted to register respectively with ports 232 formed in the lower wall of the supply chamber 110 when the mechanism is in the normal position as shown in Fig. 3. Similarly, radial passages 234 are formed in the sleeve member 175 adjacent the chambers 229 and are adapted to establish communication therefrom through ports 236 formed in the lower wall of the other supply chamber 120 within the portion 120a thereof, as is best shown in Fig. 5 of the drawings.

For conveying oil under pressure from the lubricating device to the different parts of the compressor to be lubricated, a plurality of conduits or pipes 238 are provided, each of which is adapted to receive oil forced from one of the chambers 228 and 229 in the manner hereinafter explained. For convenience the pipes 238 may be grouped upon opposite sides of the lowermost portion of the lubricator casing, each pipe being connected to one of a number of passages 240 formed in the casing and leading to the bore 177 in which the rotatable sleeve member 175 is mounted, as shown in Fig. 5. Each of the passages 240 is adapted to register with one of the respective radial passages 231 and 234 in the sleeve member 175 upon rotation of the member in a counterclockwise direction, as viewed in Fig. 5. In order to prevent possible leakage of oil under pressure from the passages 240 by back flow past the sleeve member 175 into the oil supply chambers, pressure release ports 241 are provided in the casing and are adapted to communicate with suitable grooves 242 formed in the sleeve member 175, each of said grooves being normally disposed directly above one of the passages 240 while the shaft member 175 is positioned as shown in Fig. 5 of the drawings.

In operation, fluid under pressure is alternately supplied to and vented from the piston chamber 146, by way of the passage 147 and pipe 150, in a series of successive cycles in response to the usual operation of the compressor associated with the lubricating device. Upon an increase in fluid pressure in the piston chamber 146, the piston 145 is forced downwardly against the pressure of the spring 151, thereby forcing the plunger 126 into the chamber 131, so as to cause the oil initially contained therein to flow through the passage 135 in the plunger and past the check valve 137 into the chamber 136, from which the oil is free to flow through the bore 139, passage 140 and aperture 141 into the metering chamber 122. Upon the subsequent reduction in fluid pressure in the piston chamber 146, the spring 151 is permitted to force the piston 145 and the plunger 126 upwardly, causing oil to be drawn from the supply chamber 110 through the passage 132 in the casing portion 127 and past the check valve 133 into the chamber 131. As this cycle of operation is continued, the oil thus supplied to the metering chamber 122 raises the float valve element 143, while fluid pressure is gradually built up in the pressure chamber 124 by flow of fluid under pressure from the chamber 146 past the ball check valve 159 and through the valve chamber 156, the passage 157 and the restricted passage 158.

When the metering chamber 122 has been substantially filled with oil so that the valve element 143 is held in engagement with the seating face 144 for cutting off communication through the passages 123 with the chamber 124, continued operation of the plunger 126 then creates sufficient hydraulic pressure acting in chamber 122 on the boss portion 162 within the seat 163 to force the valve piston 161 downwardly, thus moving the boss portion 162 away from the seat 163. The pressure of fluid in the chamber 124 thereupon forces oil into the chamber 165 and acts on the entire pressure area of the valve piston through the medium of the oil, so that the valve piston is forced into engagement with the stop member 167 for establishing communication from the chamber 165 through the passageway 171 to the chamber 189.

The pressure of oil thus admitted to the chamber 189 acts against the vane 191 so as to force the vane away from the pin 192, thereby rotating the sleeve member 175 in a counterclockwise direction, as viewed in Fig. 8, the sleeve member in so turning operating the arm 198 and the rod 202 to compress the spring 206.

Upon the initial rotation of the sleeve member 175, the arcuate valve element 194 is operated to lap the passage 187, and as rotation of the sleeve member is continued, the valve element is finally moved into engagement with the wall 185, the vane 191 at the same time establishing communication from the passage 189 to the passage 187. It will be understood that during this operation the oil initially contained in the chamber 186 is free to flow therefrom and through the passage 188 to the oil supply chamber 110.

As the sleeve member 175 is thus rotated in a counter-clockwise direction, the passages 231 and 234 are moved out of registration with the respective ports 232 and 236 formed in the lower walls of the supply chambers 110 and 120, respectively, and said passages 234 and 231 are then brought into registration with the passages 240 formed in the casing, as will best be understood by reference to Fig. 5 of the drawings. It will also be understood that while the sleeve member 175 is rotating as just described, the pump elements 221 and 223 are maintained apart by the several springs 225, the chambers 228 and 229 at the ends of said pump elements having been initially charged with oil by gravity flow thereof from the supply chamber 110 and the chambers 229 with oil from the supply chamber 120.

Meanwhile, when the chamber 189 is connected to the passage 187, oil under pressure is quickly supplied through said chamber and passage and through the chamber 179 and the passage 214 in the end 178 of the cylinder portion into the piston chamber 213, and the piston 212 is thereby moved toward the right-hand, carrying with it the plunger 220. The force with which the plunger 220 is thus moved is sufficient to overcome the pressure of the various springs 225, so that the pump elements 221 and 223 are shifted toward the right-hand and are gathered together, thereby displacing the oil from the respective chambers 228 and 229. The pump elements 221 and 223 are now positioned as illustrated in Fig. 4 of the drawings.

As the pump elements 221 and 223 are thus brought together, the oil displaced from the chambers 228 is forced through the passages 231 and through the passages 240 registering therewith to the corresponding delivery pipes 238, from which the oil under pressure is supplied to the compressor, and at the same time the oil displaced from the chambers 229 is forced under pressure to the passages 234 and through the corresponding passages 240 and pipes 238 for lubricating other parts of the compressor.

Meanwhile, as the oil distributing mechanism in the lower part of the casing of the lubricating device functions to deliver oil under pressure to the compressor in the manner just described, the oil remaining in the metering chamber 122 is forced past the valve piston 161 and through the chamber 165 and the restricted passage 169 into the supply chamber 110, by the pressure of air bottled up in the chambers 124 and 122. After substantially all of the oil has been driven out of the metering chamber 122 and the chamber 165 into the chamber 110 as just explained, the air under pressure is quickly vented from the connected chambers 124 and 122 by flow through the chamber 165, the passage 169, the chamber 110, the passage 154, and past the check valve 155 to the chamber 148, and with the pressure in the chamber 165 thus reduced, the spring 166 is permitted to move the valve piston 161 upwardly until the boss portion 162 again engages the valve seat 163.

The pressure of oil in the chamber 189 is at the same time reduced as a result of the reduction of pressure in the chamber 165 as just explained, so that the spring 206 is enabled to operate the plunger 202 and the arm 198 for turning the sleeve member 175 in a clockwise direction, until the vane 191 is again moved into engagement with the stop pin 192, as will be understood by reference to Figs. 7 and 8 of the drawings. While the vane 191 thus approaches the pin 192, oil contained in the chamber 189 is permitted to flow into the chamber 186 by way of the restricted relief port 193.

During the rotary movement of the sleeve member 175 in a clockwise direction, the arcuate valve element 194 is adapted to cover the passage 187 for preventing flow of oil from the piston chamber 213 by way of passage 214, the chamber 179, and through the passage 187, the oil remaining in the chamber 213 thus being effective to maintain the piston 212 and plunger 220 in the position in which said plunger holds the pump elements 221 and 223 gathered together against the combined pressures of the springs 225, as shown in Fig. 4 of the drawings. Just prior to engagement of the vane 191 with the stop pin 192, however, the port 187 is uncovered by the vane 194, oil being then free to flow from the chamber 213 by way of the passage 187, through the chamber 186 and the passage 188 to the chamber 110, thereby substantially relieving the piston 212 of fluid pressure. The springs 225 are then permitted to force the pump elements 221 and 223 apart, and since the passages 231 and 234 have again been brought to registration with the respective ports 232 and 236, oil is thus drawn from the supply chambers 110 and 120 respectively, by way of said communications into the chambers 228 and 229.

It will be noted that a manually operable valve 244 is provided for controlling a by-pass communication which leads from the pipe 150 by way of the passage 147 and chamber 146 and through a passage 245 formed in the casing to the passageway 171. As will readily be understood from the description already presented in connection with the valve 92 shown in Fig. 1 of the drawings, the valve 244 is adapted to be operated to its open position for permitting the supply and release of air under pressure to and from the chamber 189 so as to cause operation of the oil distributing mechanism at a more rapid rate than is effected by the normal operation thereof as hereinbefore described.

Summarizing, according to my invention there is provided improved means for lubricating a compressor or the like, which means comprises a fluid pressure operated pump adapted gradually to supply oil under pressure to a metering or timing chamber, and force-feed distributing mechanism responsive to a predetermined pressure of oil periodically built-up in the chamber for supplying the proper quantity of oil under pressure for lubricating the compressor, the distributing mechanism being constructed and arranged to prevent undesired back flow of oil from said compressor. In addition, the invention provides means for operating the oil distributing mechanism at a fast rate for increasing the quantity of oil supplied during a given period when desired, and may be embodied in a lubricating device for supplying more than one grade of oil through separate communications to different operating parts of the compressor.

While two illustrative embodiments of the invention have been described in detail, it is not my intention to limit its scope to those embodiments or otherwise than by the terms of the appended claims.

Having now described my invention, what I claim as new and desire to secure by Letters Patent, is:

1. In a force-feed lubricator, in combination, a casing having a supply chamber containing a quantity of fluid lubricant, and a control chamber, a pump operable to supply fluid lubricant from said supply chamber to said control chamber, and lubricant distributing means operative upon a predetermined increase in the pressure of lubricant within said control chamber to force a quantity of lubricant under pressure from said supply chamber to a delivery communication.

2. In an automatic lubricator, in combination, a casing having a supply chamber containing a quantity of fluid lubricant, and a control chamber, a pump operable by fluid pressure to supply lubricant from said supply chamber to said control chamber, means for supplying fluid under pressure to said control chamber, and lubricant distributing means operative on a predetermined increase in the pressure of lubricant within said control chamber to force a quantity of lubricant under pressure from said supply chamber through a delivery communication.

3. In a lubricating device, in combination, a casing having a lubricant supply chamber, and a control chamber, a pump operable by fluid pressure to supply fluid lubricant from said supply chamber to said control chamber, a float valve in said control chamber adapted to control communication from said control chamber to a pressure outlet, said float valve being operative to cut off said communication when the control chamber is substantially filled with fluid lubricant, and lubricant forcing means operative upon a predetermined increase in the pressure of lubricant within said control chamber to supply a quantity of lubricant under pressure from said supply chamber.

4. In a lubricating device, in combination, a casing having a fluid lubricant supply chamber and a control chamber, a pump operable by fluid pressure to supply fluid lubricant from said supply chamber to said control chamber, an auxiliary chamber communicating with said control chamber, a float valve operative by fluid lubricant filling the control chamber to cut off communication therefrom to said auxiliary chamber, and force-feed lubricating means rendered operative on a predetermined increase in the pressure of fluid lubricant in said control chamber, following seating of said float valve, to deliver lubricant from the supply chamber under the pressure of fluid in said auxiliary chamber.

5. In a lubricating device, in combination, a casing having a fluid lubricant supply chamber and a control chamber, a pump operable by fluid pressure to supply fluid lubricant from said supply chamber to said control chamber, an auxiliary chamber communicating with said control chamber, a float valve operative by fluid lubricant filling the control chamber to cut off communication therefrom to said auxiliary chamber, force-feed lubricating means operative under pressure of fluid in said auxiliary chamber in response to a predetermined increase in the pressure of fluid lubricant in said control chamber effected on closing of said valve, and means operative to establish discharge communication for the return flow of the fluid lubricant from said control chamber to said supply chamber upon operation of said force-feed lubricating means.

6. In a force-feed lubricator, a casing having a control chamber and a liquid supply chamber, a pump operative to force liquid from said supply chamber to said control chamber, lubricant forcing means operable to deliver lubricant under pressure through a communication, and fluid pressure responsive means adapted to operate said lubricant forcing means upon a predetermined increase in the pressure of the liquid in said control chamber.

7. In a force-feed lubricator, in combination, a casing having a fluid lubricant supply chamber and a control chamber, a pump operative to force fluid lubricant from said supply chamber to said control chamber, lubricant forcing means operative upon an increase in pressure in an operating chamber for supplying lubricant under pressure through a delivery communication, and control valve means operative on a predetermined increase in the pressure of the liquid in said control chamber to establish communication therefrom to said operating chamber.

8. In an automatic lubricator, in combination, a casing having a control chamber, an auxiliary chamber communicating therewith, and a supply chamber containing a supply of fluid lubricant, a pump operative to force lubricant from said supply chamber into said control chamber, means for supplying fluid under pressure to said auxiliary chamber, a floating check valve adapted to prevent the flow of lubricant from the control chamber to the auxiliary chamber, while permitting application of the pressure of fluid in the auxiliary chamber to lubricant in said control chamber, force-feed lubricant distributing means operative on an increase in the pressure of fluid in an operating chamber, and control valve means operative on a predetermined increase in the pressure of lubricant in said control chamber to establish communication from said control chamber to said operating chamber for effecting operation of said force-feed means by the pressure of fluid in said auxiliary chamber acting through the medium of lubricant in said control chamber.

9. In an automatic lubricating device, in combination, a casing having an oil supply chamber, a control chamber, and an auxiliary chamber communicating with said control chamber, oil pump means operative according to variations in pressure of fluid in a piston chamber for pumping oil from said supply chamber into said control chamber, a communication through which fluid under pressure is supplied from said piston chamber to said auxiliary chamber, a check valve preventing back flow of fluid through said communication, a float valve element adapted to prevent oil pumped into the control chamber from entering the auxiliary chamber while permitting application of the pressure of fluid in the auxiliary chamber to the oil in said control chamber, fluid pressure operated oil distributing means operative to supply oil under pressure from the supply chamber, and valve means operative by a predetermined hydraulic pressure in said control chamber for establishing communication through which oil may be supplied to said oil distributing means under the pressure of fluid in said auxiliary chamber.

10. In an automatic lubricating device, in combination, a casing having an oil supply chamber, a control chamber, and an auxiliary chamber communicating with said control chamber, oil pump means operative according to variations in pressure of fluid in a piston chamber for pumping oil from said supply chamber into said control chamber, a communication through which fluid under pressure is supplied from said piston chamber to said auxiliary chamber, a check valve preventing back flow of fluid through said communication, a float valve element adapted to prevent oil pumped into the control chamber from entering the auxiliary chamber while permitting application of the pressure of fluid in said auxiliary chamber to the oil in said control chamber, fluid pressure operated oil distributing means operative to supply oil under pressure from the supply chamber, valve means operative by a predetermined hydraulic pressure in said control chamber for establishing communication through which oil may be supplied to said oil distributing means under the pressure of fluid in said auxiliary chamber, and a restricted return flow passage through which oil and fluid may flow from said control chamber to the oil supply chamber.

11. In an automatic lubricating device, in combination, a casing having an oil supply chamber, a control chamber, and a piston chamber adapted to be subjected to alternately increasing and decreasing fluid pressure, oil pumping means operative in accordance with variations in pressure in said piston chamber to pump oil from supply chamber into said control chamber, oil forcing means adapted to be operated by fluid pressure for supplying oil under pressure from said supply chamber, normally closed control valve means periodically operative in response to a predetermined increase in fluid pressure in said control chamber to supply oil under pressure therefrom for operating said oil forcing means, and manually operable valve means for establishing a by-pass communication from said piston chamber to said oil forcing means.

12. In an automatic lubricating device, in combination, a casing having an oil supply chamber, a control chamber, and a piston chamber adapted to be subjected to alternately increasing and decreasing fluid pressure, oil pumping means operative in accordance with variations in fluid pressure in said piston chamber to pump oil from said supply chamber into said control chamber, means for subjecting oil in said control chamber to fluid pressure, fluid pressure operated force-feed means for supplying oil under pressure from said supply chamber, a valve adapted to control communication from the control chamber to said force-feed means, and having an inner pressure area surrounded by an outer pressure area, and a spring normally maintaining said valve seated with only the inner pressure area thereof subjected to the pressure of oil in said control chamber, said valve being operative upon a predetermined increase in the pressure of oil in said control chamber to supply oil under pressure therefrom to said force-feed means and to establish communication from said control chamber to the supply chamber through a restricted passage.

13. A lubricator comprising a casing having a supply chamber containing a supply of fluid lubricant and a control chamber adapted to be supplied with fluid under pressure, pump means operative to supply oil from said supply chamber to said control chamber, valve means operative on a predetermined increase in the pressure of oil in said control chamber to supply oil under pressure from said chamber through a passageway, and oil forcing means including a pump element operatively mounted in a bore communicating with said oil supply chamber, biasing means urging said pump element into a normal position for permitting said bore to be filled with oil from said supply chamber, and fluid pressure means responsive to the pressure of oil supplied through said passageway for operating said pump element to displace the oil from said bore.

14. An automatic lubricator comprising a casing having a fluid lubricant supply chamber and a control chamber, force-feed lubricating means adapted to be operated upon a predetermined increase in the pressure of fluid in said control chamber for supplying lubricant under pressure from said supply chamber through a delivery communication, pumping means operative to force lubricant from said supply chamber into said control chamber, and means for adjusting said pumping means to vary the rate at which fluid lubricant is supplied thereby from said supply chamber to said control chamber.

15. An automatic pressure lubricator comprising a casing having a plurality of lubricant supply chambers, and a control chamber, pump means operative to supply lubricant from one of said chambers to said control chamber, force-feed distributing mechanism operative upon an increase in fluid pressure to supply fluid lubricant under pressure from each of said supply chambers through separate communications, and valve means operative upon a predetermined increase in the pressure of lubricant in said control chamber to supply lubricant under pressure therefrom to said force-feed distributing mechanism.

16. In a lubricating device, in combination, a casing having a control chamber, fluid pressure means operative to effect periodic build up of fluid pressure in said control chamber, lubricant forcing means operative to supply lubricant under pressure through a delivery communication, a movable abutment operative on an increase in the pressure of fluid in an operating chamber to actuate said lubricant forcing means, and valve means responsive to each predetermined increase in the pressure of fluid in said control chamber to supply fluid under pressure therefrom to said operating chamber.

17. An automatic lubricating device comprising a casing having an oil supply chamber, a pressure chamber and a control chamber communicating therewith, means for supplying fluid under pressure to said pressure chamber, oil pumping means operable to pump oil from said supply chamber into said control chamber, a float check valve operative when said control chamber is filled with oil to prevent flow of oil therefrom into said pressure chamber while permitting communication of the pressure of the fluid in said pressure chamber to the oil in said control chamber, fluid pressure operated force-feed lubricating mechanism, and means controlling communication from the control chamber to said fluid pressure operated mechanism comprising a normally seated valve having an inner pressure area always subject to pressure of oil in said control chamber, and an outer pressure area adapted to be subjected to fluid pressure upon the unseating of said valve in response to the increase in oil pressure following each closing of said float check valve, said control valve being operable periodically to supply oil under the pressure of fluid in said pressure chamber for operating said force-feed lubricating mechanism.

18. An automatic lubricating device comprising a casing having an oil supply chamber, a control chamber and a piston chamber adapted to be subjected to alternately increasing and decreasing fluid pressures, a piston, oil pumping means operative thereby in accordance with variations in fluid pressure in said piston chamber to pump oil from said supply chamber into said control chamber, means for also supplying fluid under pressure to said control chamber, fluid pressure operated lubricating mechanism, control valve means operative upon a predetermined increase in the pressure of oil in said control chamber to establish communication therefrom to said fluid pressure operated lubricating mechanism for effecting operation of said mechanism by the pressure of fluid and oil accumulated in said control chamber, a restricted release port through which oil and fluid may gradually escape from said fluid pressure operated mechanism to said oil supply chamber following operation of said mechanism, a communication through which fluid under pressure may flow from the oil supply chamber above the level of the oil therein to said piston chamber for thereby utilizing any oil vapor carried with said fluid, and a check valve preventing back flow of fluid under pressure through said communication.

BURTON S. AIKMAN.